United States Patent Office 3,739,036
Patented June 12, 1973

3,739,036
METHOD OF PREPARING 3,3,3-
TRIFLUOROPROPENE-1
John A. Valicenti, Roland L. Halm, and Forrest O. Stark, Midland, Mich., assignors to Dow Corning Corporation, Midland, Mich.
No Drawing. Filed Sept. 30, 1971, Ser. No. 185,392
Int. Cl. C07c 17/20, 21/18
U.S. Cl. 260—653.3                        5 Claims

ABSTRACT OF THE DISCLOSURE $CF_3CH=CH_2$ is prepared by contacting a halogenated hydrocarbon, such as 1,1,1,3-tetrachloropropane, with sodium fluoride at a temperature of from 400 to 475° C. for at least five minutes.

---

This invention is directed to a process in which sodium fluoride is utilized as a fluorination agent. In one aspect, the invention is directed to the production of 3,3,3-trifluoropropene-1.

Although calcium fluoride is readily available in the form of fluorite, it is relatively inactive as a fluorination agent for chlorinated hydrocarbons. As discussed in British Pat. 1,238,932, calcium fluoride is reacted with a strong acid to obtain hydrofluoric acid which is used as the fluorinating agent. Calcium fluoride alone does act as a fluorinating agent for some hydrocarbons at high temperatures. The fluorides of other metals, such as potassium, sodium, lithium, barium and aluminum, exhibit, to one degree or another, the same lack of fluorination activity.

By the practice of the present invention, wherein sodium fluoride is utilized as the fluorination agent to obtain 3,3,3-trifluoropropene-1, good yields of the fluorinated olefin are obtained. This is especially surprising since the use of other metal fluorides resulted in decomposition of the reactants under the same conditions.

Thus, it is an object of the invention to provide an improved method for the production of 3,3,3-trifluoropropene-1.

In accordance with the present invention, there is provided a method of preparing 3,3,3-trifluoropropene-1 comprising contacting a halogenated hydrocarbon selected from the group consisting of 1,1,1,3-tetrachloropropane and 1,1,3-trichloropropene-1 with sodium fluoride at a temperature of from about 400° C. to 475° C. for at least five minutes.

The sodium fluoride is a solid salt and retains its solid crystalline form at the reaction temperatures. The most practical method of contacting the halogenated hydrocarbon with the fluoride is to flow the hydrocarbon through a fixed-bed reaction vessel which contains sodium fluoride in the fixed bed. Passage of the hydrocarbon through the fixed bed is facilitated by dilution with an inert carrier gas, such as nitrogen or helium. Another method of contacting the hydrocarbons and the fluoride is to utilize a fluidized bed reactor.

Retention time in the reactor is critical. $CF_3CH=CH_2$ is not formed until at least five minutes contact time has elapsed. It is preferred to maintain the hydrocarbons in contact with the sodium fluoride for at least ten minutes in order to obtain optimum yields. Reaction in the defined temperature range (400–475° C.) is necessary to produce the desired 3,3,3-trifluoropropene-1.

The starting materials used in the present process, $Cl_3CCH_2CH_2Cl$ and $CCl_2=CHCH_2Cl$, are known chlorinated hydrocarbons which are commercially available. The product, $CF_3CH=CH_2$, is a valuable precursor in the preparation of 3,3,3 - trifluoropropylmethylpolysiloxanes which have utility as lubricants. In preparing the polysiloxane lubricant, 3,3,3-trifluoropropene is reacted with $(CH_3)HSiCl_2$ in the presence of a platinum catalyst to obtain 3,3,3-trifluoropropylmethyldichlorosilane which is hydrolyzed and condensed to yield the cyclic trisiloxane. The cyclic siloxane is polymerized in the presence of tetrafluoroethane sulfonic acid to obtain a linear polymer which has received wide acceptance as a lubricant.

The following examples are intended to be merely illustrative of the invention defined in the claims.

EXAMPLE 1

A 4 ft. x ¾ inch-diameter stainless steel column was packed with 183.8 grams of sodium fluoride over 2.7 grams of molecular sieve material and heated at 400° C. for 24 hours under a vacuum. The column was fitted with injection ports at the top and a cold trap at the bottom. A small amount of 1,1,1,3-tetrachloropropane (2.38 grams) was injected into the column along with helium at a regulated helium flow rate of 10 ml./min. Small amounts of liquid were immediately collected in the cold (−75° C.) trap, followed by a 10 minute delay, followed by 20 minutes reaction time after which the cold trap was full. A second liquid product fraction was collected until, after a total of 60 minutes, it was apparent that the reaction was complete.

The first fraction of liquid product (0.65 gram) was analyzed by infrared spectroscopy, gas chromatography and mass spectrometry. The fraction contained 92 percent $CF_3CH=CH_2$. The second fraction (0.73 gram) contained 70 percent $CF_3CH=CH_2$.

EXAMPLE 2

Into the column described in Example 1 packed with 194 grams of sodium fluoride at a temperature of 470° C., 2 mls. (2.8 grams) of 1,1,3-trichloropropene-1 were injected with a helium flow rate of 10 ml./min. to obtain a 27 percent yield of $CF_3CH=CH_2$.

The substitution of calcium fluoride and ammonium fluoride and trisodium aluminum hexafluoride for the sodium fluoride showed these other fluorides to be ineffective; generally, resulting in decomposition of the reactants.

Reasonable modification and variation are within the scope of the present invention which is directed to a method of producing 3,3,3-trifluoropropene-1.

That which is claimed is:

1. A method of preparing 3,3,3-trifluoropropene-1 comprising contacting a halogenated hydrocarbon selected from the group consisting of 1,1,1,3-tetrachloropropane and 1,1,3-trichloropropene-1 with sodium fluoride at a temperature of from about 400° C. to 475° C. for at least five minutes.
2. The method of claim 1 wherein the halogenated hydrocarbon is 1,1,1,3-tetrachloropropane.
3. The method of claim 1 wherein the halogenated hydrocarbon is 1,1,3-trichloropropene-1.
4. The method of claim 1 wherein the step of contacting is by flowing the halogenated hydrocarbon over a fixed bed of sodium fluoride.
5. The method of claim 4 wherein the halogenated hydrocarbon is contained in an inert gaseous carrier.

References Cited
UNITED STATES PATENTS
2,842,603    7/1958    Miller.

DANIEL D. HORWITZ, Primary Examiner